United States Patent [19]

Meyer et al.

[11] 4,210,384
[45] Jul. 1, 1980

[54] INVERTED-DESIGN OPTICAL MICROSCOPE

[75] Inventors: Manfred Meyer, Heidenheim; Willi Keydell, Oberkochen; Friederich K. Möllring, Aalen; Klaus Weber, Koenigsbronn, all of Fed. Rep. of Germany

[73] Assignee: Carl Zeiss-Stiftung, Oberkochen, Fed. Rep. of Germany

[21] Appl. No.: 40,080

[22] Filed: May 17, 1979

Related U.S. Application Data

[63] Continuation of Ser. No. 820,260, Jul. 29, 1977, abandoned.

[30] Foreign Application Priority Data

Sep. 11, 1976 [DE] Fed. Rep. of Germany ....... 2640974

[51] Int. Cl.² ............................................. G02B 21/22
[52] U.S. Cl. ...................................... 350/19; 350/50; 350/54
[58] Field of Search .............................. 350/19, 12–15, 350/39, 48, 49, 50, 54, 82, 86, 87, 9

[56] References Cited

U.S. PATENT DOCUMENTS

| | | |
|---|---|---|
| 1,998,216 | 4/1935 | Bauersrfeld .......................... 350/87 |
| 3,202,047 | 8/1965 | Lawler .................................. 350/49 |
| 3,405,989 | 10/1968 | Mentink ................................ 350/19 |
| 3,551,019 | 12/1970 | Michel .................................. 350/87 |

OTHER PUBLICATIONS

Unitron Metallograph, advertisement, 1965.
Unitron . . . for Biology, advertisement, 1965.

*Primary Examiner*—Jon W. Henry
*Attorney, Agent, or Firm*—Hopgood, Calimafde, Kalil, Blaustein & Lieberman

[57] ABSTRACT

The invention contemplates an optical microscope of inverted design and having versatility for application to solve and serve virtually all microscopy problems and needs. The microscope features a particular U-shaped housing with upstanding legs and with integrated optical elements contained within and carried by said housing. A rugged specimen table is removably secured to both legs, and is presented for viewing a specimen on said table via either reflected light or via transillumination, the light source in both cases being so mounted to the exterior of the housing as to be thermally isolated from the housing and from the lens system, the latter being vertically adjustable in the space between the housing legs and beneath the specimen table. Various further features are described.

12 Claims, 6 Drawing Figures

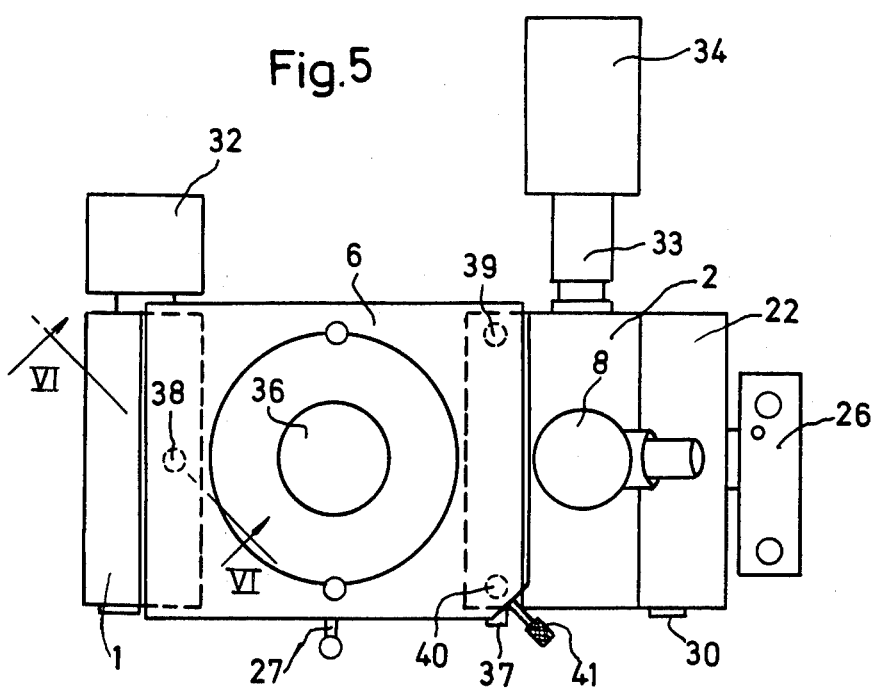
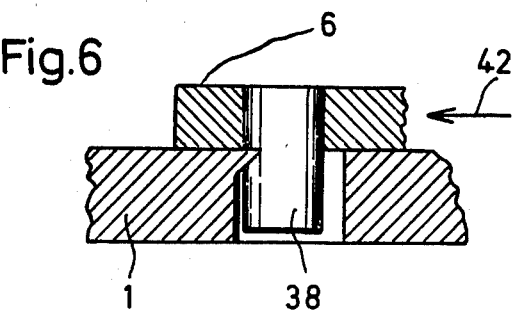

INVERTED-DESIGN OPTICAL MICROSCOPE

This is a continuation of copending application Ser. No. 820,260, filed July 29, 1977 now abandoned.

This invention relates to an optical microscope of inverted design.

Such microscopes serve for observing, from below, objects lying above an opening in the specimen table and are used predominantly in metallography, chemistry, and biology.

It is know to construct inverted microscopes such that the specimen table is fastened on one side to a stand and is moved for focusing. But when a heavy object must be scanned by movement on such a specimen table, a disturbing blur frequently occurs, due to vibrations between the preparation and the lens. This disadvantage, although somewhat reduced, is also present in the case of inverted microscopes in which the specimen table is rigidly fastened on one side to the stand and in which the lens effects the focusing displacement.

It is also known to construct a universal microscope using the building-block principle, wherein the housings of the building-block components form the supporting body for the microscope and are symmetrical with respect to the axis of the lens. It is true that when such a technique is employed to construct an inverted microscope, a very stable structure results, but the observer does not have a free view of the specimen in the working position. Such free view of the specimen is important for routine examinations. Another disadvantage of this microscope is that it is relatively expensive due to its design for universal use.

All known inverted optical microscopes, with the exception of the last-mentioned one, furthermore have the disadvantage that their structure becomes more and more unstable upon the addition of attachments, particularly for miniature-film and projection photography.

The object of the present invention is to provide an inverted optical microscope which has an extremely stable structure which is easy to operate and which, with the use of only a few attachments, makes it possible to carry out all tasks arising in microscopy and gives the observer a free view of the specimen in working position.

The new inverted optical microscope is characterized by a closed, U-shaped housing with integrated optical elements for guiding and controling the beam. The legs of the housing are adapted for the attachment of a source of light and of the observation tube; and the specimen table is secured to the legs, thus interconnecting the legs and establishing a side-access recess or opening in the housing. A lens holder which is displaceable for focusing is arranged within the recess of said housing.

The U-shaped housing permits establishment of the more stable basic body, namely a right parallelepiped, with a central side-access opening to permit free unimpeded access to the lens holder in said opening. The stability of the parallelepiped is achieved, for all practical purposes, by using the specimen table to firmly connect the two housing legs to each other. A specimen lying on this table can thus be shifted without causing vibration between the specimen and the lens.

One of the housing legs is so constructed that it may serve either for holding a source of light for incident illumination, or for holding a source of light for transillumination. The source of light always remains outside the housing, so that heat developed by the source cannot result in any disturbance.

The other housing leg is constructed to contain the deflection systems, focusing systems, diaphragms, and connections for observation; and, in a more extensively equipped instrument, this other housing leg also serves documentation and measurement purposes. The observation tube is arranged on the top of this other leg, so that the observer may always have an unimpeded view of the preparation. In a specially equipped model, a projection camera is integrated into this housing leg, the field of the camera being presented for observation at the side of the housing which faces the observer. Further an attachment tube for a miniature camera is externally presented, for ease of removability and handling from the outside.

This other housing leg is preferably also constructed to contain a replaceable side-cover plate carrying replacement optical elements necessary for special purposes. The new microscope can therefore be rapidly and simply adapted to different purposes of use by replacement of said cover plate, without affecting the stability of the housing.

Further stability is achieved in the new microscope by using three points to mount and secure the specimen table to the housing legs, with inherent static stability.

The invention will be described in further detail below with reference to FIGS. 1 to 6 of the accompanying drawings, in which:

FIG. 5 is a plan view of an embodiment with a motion-picture camera attached; and FIG. 6 is an enlarged fragmentary local sectional view to show a detail of the attachment of the specimen table.

Figure 1:
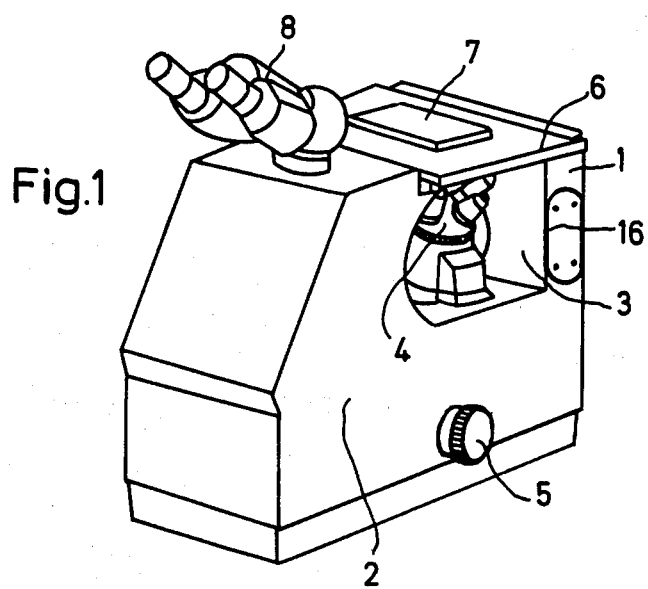
FIG. 1 is a perspective view of one embodiment of the optical microscope of the invention.

Referring to FIG. 1, the new optical microscope has a U-shaped housing, the upstanding spaced legs of which are designated 1 and 2. In the recess or space 3 between said legs there is arranged a lens holder, shown as lens turret 4, which can be moved up and down for focusing by means of a knob 5. The two housing legs 1 and 2 are rigidly connected to each other by means of a specimen table 6, a specimen 7 being shown on the table 6 in readiness for observation.

An observation tube 8 is carried at the top of the housing leg 2, tube 8 being in this case a binocular-viewing tube. The height of the housing is such that the observation tube 8 lies at convenient eye level. The observer's view of the specimen 7 is always free, and the observer can carry out all necessary manipulations of the specimen, unimpeded. Since the specimen table is not moved, such manipulations are not affected by focusing adjustments.

Figure 2:
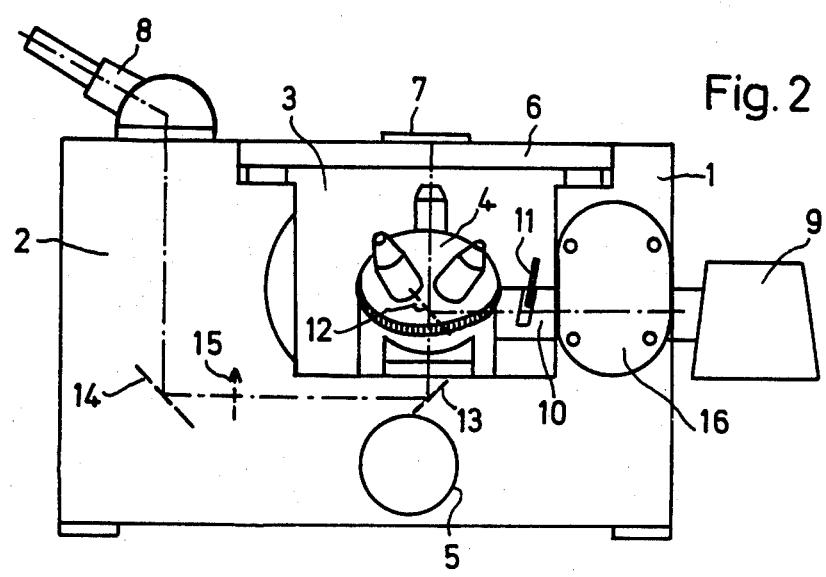
FIG. 2 is a side view in elevation of another embodiment.

The U-shaped housing contains optical elements for guiding and controlling the beam of light, as will be explained in further detail with reference to FIG. 2. In FIG. 2, a microscope illuminator 9 is attached to the rear opening of the housing leg 1. This illuminator is thus firmly connected to the housing, but at the same time, and from a thermal standpoint, the illuminator 9 is essentially decoupled from the housing. A tube 10 which contains a field diaphragm is mounted between leg 1 and lens carrier 4, a lever 11 serving to actuate the diaphragm. Light emerging from illuminator 9 passes through tube 10 and impinges on an inclined semi-transparent mirror 12; thereafter, it is conducted to the underside of the specimen 7 by the lens which is in working position. The light reflected from the bottom of the specimen passes through the lens and the mirror 12 and is deflected by means of a mirror 13, the intermediate image being produced at 15. By means of a 1:1 image-forming system (not shown), the intermediate image is transferred, via another mirror 14, to the eyepiece image plane in the observation tube 8.

The reflection elements shown in dashed lines as well as imaging means (not shown) are integrated in the housing. They thus lie protected within the housing itself, and the housing, due to its stability, also assures stability of the position of the optical elements.

The housing leg 1 has another lateral opening which is closed by the plate 16. If a microscope illuminator with Kohler incident illumination is used, it may be suitably connected to this lateral opening in leg 1. In this way, one avoids having a length-extending illuminator dictate a microscope that is too deep.

Figure 3:
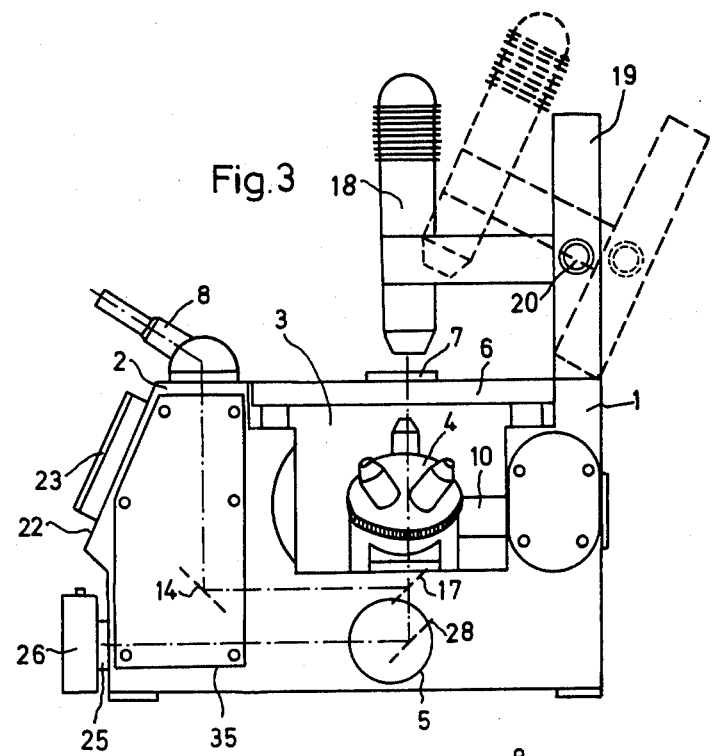
FIG. 3 is a side view in elevation of the instrument of FIG. 1, equipped with transillumination.

In the arrangement of FIG. 3, an illuminator 18 for transillumination of the specimen 7 is arranged on the top of the housing leg 1. This illuminator is suspended from a support 19 and is adjustable in height by means of a knob 20. The fastening of the support 19 is effected in this case by a hinge (not shown), which makes it possible to swing the support and illuminator back into its retracted position, shown in dashed lines.

Upon this backward swinging, the center of gravity passes beyond the hinge, so that the retracted position is in inherently stable position. The specimen 7 is freely accessible in the retracted position of illuminator 18, so that the observer can carry out all necessary manipulations without hindrance.

Figure 4:
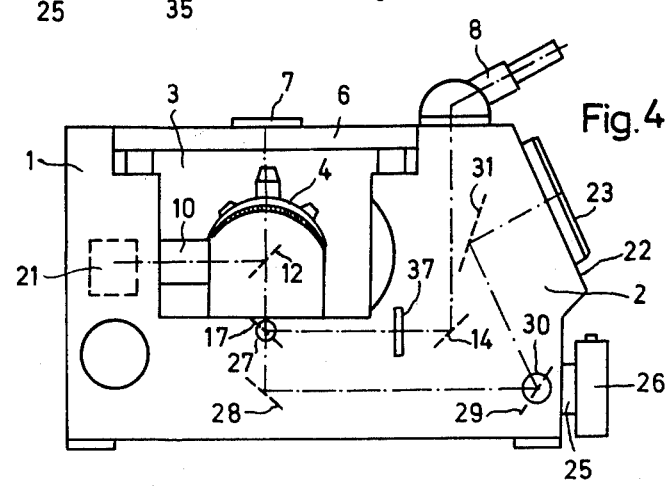
FIG. 4 is a view in elevation of the other side of the instrument of FIG. 1, equipped with incident illumination.

The arrangement of FIG. 4 differs from that of FIG. 3 in that an illuminator for incident illumination is fastened laterally to the housing leg 1, as described above (e.g., upon removing plate 16, FIG. 2). Light from such an illuminator is fed via a mirror 21, tube 10 and splitting mirror 12 to the lens which is in working position.

Each of the microscopes shown in FIGS. 3 and 4 is provided with a relatively large projection camera which is integrated in the housing leg 2 and makes possible pictorial documentation, for example in a frame size of 9×12 cm. The picture produced by this camera appears on the surface 22 of the housing leg 2 facing the observer and can be observed there by means of a removably attached ground-glass plate 23.

An attachment tube 25 for a replaceable miniature camera 26 is also provided. Light coming from the specimen 7 is divided, in the picture-taking position, by a semitransparent mirror 17 which is inserted by means of a push rod 27 in place of the full mirror 13 (which in FIG. 2 only serves for visual observation) at the same point in the ray path. The light is then conducted, via a mirror 28, to a miniature camera 26 (FIG. 3); alternatively (FIG. 4), a mirror 29 is brought, by actuation of the knob 30, into the ray path which conducts the light via another mirror 31 to the larger camera (having the viewing screen 23).

It will be understood that, to avoid encumbrance in the drawing, image-forming optical systems have not been shown in FIGS. 3 and 4.

As can be noted from FIG. 3, the housing leg 2 has a lateral cover plate 35, readily removable via the screw fasteners shown. This plate 35 will be understood to securely mount further optical elements which may be needed for special uses of the microscope. Thus, for instance, the cover plate 35 of FIG. 3 is replaced for the attachment of a motion picture camera 34 (FIG. 5). In such case, the plate which replaces plate 35 will be understood to have a lateral opening and to mount reflection elements as appropriate, for lateral-attachment accommodation of camera 34 via tube means 33. In FIG. 5, the camera 34 itself is arranged alongside the microscope on a support (not shown) and photographs the picture of a specimen 36 which is illuminated by a laterally attached light source 32.

The new microscope affords the possibility of providing a slide 37 (by side-insertion) at the location of the intermediate image 15 of the beam extending to the observation tube 8. This makes it possible to introduce into the path of the beam, line figures which may provide, for instance, the measuring-scale convenience of an eyepiece micrometer, or which indicate the outer frame of the field of the photograph being taken; these line figures, being on the beam split for viewing at 8, are not included in the photograph.

The specimen table 6, as shown in FIG. 5, is mounted at three points on the housing legs 1 and 2, being connected by three substantially cylindrical pins 38, 39, 40, which engage in corresponding holes in the housing. As shown in FIG. 6, the pin 38 and the hole in the housing leg 1 have coacting bevel surfaces. By actuating the single clamping screw 41, a force is exerted in the direction of the arrow 42, which force brings the bevels against each other and thus fixes the specimen table 6 in position.

The described embodiments and arrangements of the invention will be seen to have achieved all stated objects. Specifically, an inverted optical microscope has been shown with an inherent capability of solving and serving all microscopy problems and needs. And the new instrument makes a real contribution in the direction of elminating the basis of prior prejudice against general use of inverted microscopes.

What is claimed is:

1. An inverted optical microscope, comprising a unitary closed housing of generally U-shape and characterized by a horizontal base portion and by two integrally related spaced upstanding legs and defining an interior space for optical elements and ray paths, optical elements contained within and carried by said housing, a rugged specimen table resting on spaced points on the upper ends of said legs and spanning the space between and interconnecting said legs, whereby said housing and thus-connected table exhibit the mechanically stable form of a right parallelepiped with a side-access opening in the space between said legs, lens-carrier means vertically adjustably carried by said housing within the space between said legs and beneath said specimen table, observation-tube means mounted on the top of one of said legs and providing ray connection with the optical elements within said housing as well as an unimpeded direct view of a specimen on said specimen table, said direct view being over said observation-tube means upon slight shifting of an observer's line of sight without substantial head movement, and light-source mounting means on the other of said legs for mounting a specimen-illuminating light source external to said housing.

2. An optical microscope according to claim 1, wherein said light-source mounting means comprises a side-wall opening on at least one side wall of said other leg with attachment means for a source of light for incident illumination, and a tube which contains a diaphragm extending between said other leg and said-lens carrier means.

3. An optical microscope according to claim 1, in which said light-source mounting means includes a hinge at the top of said other leg for swingable support and positioning of a source for transillumination of a specimen on the table.

4. An optical microscope according to claim 1, in which said other housing leg includes an attachment tube for removable mounting of a miniature-film camera means, and means including a semitransparent mirror carried by said housing and externally actuable to divide part of the observation ray into a photographing ray when in photographing position.

5. An optical microscope according to claim 1, in which a projection camera is integrated into the other housing leg, the imaged field of said projection camera being observable at a screen surface carried by said housing beneath said observation-tube means and therefore facing the observer.

6. An optical microscope according to claim 5, in which said one housing leg contains the projection camera and at the same time the attachment tube for a miniature-film camera, and in which a mirror carried within said housing is externally actuated to enable selective use of one to the exclusion of the other of such cameras.

7. An optical microscope according to claim 1, in which said other housing leg is provided with an interchangeable lateral cover plate on which optical elements necessary for special purposes are mounted.

8. An optical microscope according to claim 1, in which said optical elements form an intermediate image within said housing, and wherein at the location of the intermediate image of the beam leading to said observation-tube means, said housing has an opening to receive a slide which contains line figures for super-position on the image of the observed specimen.

9. An optical microscope according to claim 1, and clamping means to secure said table and legs at said points.

10. An optical microscope according to claim 9, in which said points comprise three substantially cylindrical pins fixed to and projecting down from said specimen table, each said pin engaging in a corresponding recess on the top of said housing legs.

11. An optical microscope according to claim 10, in which said pins and recesses have coacting bevel-cam surfaces which react to secure said table to said legs in response to a single lateral thrust, and in which said clamping means comprises a single clamping screw reacting between one of said legs and said table for applying said thrust to said table.

12. An inverted optical microscope, comprising a unitary closed housing of generally U-shape and characterized by a horizontal base portion and by two integrally related spaced upstanding legs and defining an interior space for optical elements and ray paths, optical elements contained within and carried by said housing, a specimen table resting on spaced points on the upper ends of said legs and spanning the space between and interconnecting said legs, whereby said housing and thus-connected table exhibit the mechanically stable form of a right parallelepiped with a side-access opening in the space between said legs, lens-carrier means vertically adjustably carried by said housing within the space between said legs and beneath said specimen table, observation-tube means mounted on the top of one of said legs and substantially at the plane of said specimen table and providing ray connection with the optical elements within said housing as well as an unimpeded view of a specimen on said specimen table, and a light-source enclosure with a cantilevered outwardly offsetting tubular connection to the other of said legs for thermally isolated mounting of a specimen-illuminating light source external to said housing.

* * * * *